US009607010B1

(12) United States Patent
Tompkins et al.

(10) Patent No.: US 9,607,010 B1
(45) Date of Patent: *Mar. 28, 2017

(54) TECHNIQUES FOR SHAPE-BASED SEARCH OF CONTENT

(71) Applicant: A9.com, Inc., Palo Alto, CA (US)

(72) Inventors: Stephen S. Tompkins, San Jose, CA (US); Leslie K. Wang, Cupertino, CA (US); Arnab S. Dhua, Mountain View, CA (US); Catherine L. Wah, La Jolla, CA (US)

(73) Assignee: A9.com, Inc., Palo Alto, CA (US)

(*) Notice: Subject to any disclaimer, the term of this patent is extended or adjusted under 35 U.S.C. 154(b) by 292 days.

This patent is subject to a terminal disclaimer.

(21) Appl. No.: 14/244,622

(22) Filed: Apr. 3, 2014

Related U.S. Application Data

(63) Continuation of application No. 13/237,099, filed on Sep. 20, 2011, now Pat. No. 8,718,369.

(51) Int. Cl.
| G06F 17/00 | (2006.01) |
| G06F 17/30 | (2006.01) |
| G06Q 30/06 | (2012.01) |

(52) U.S. Cl.
CPC .. *G06F 17/30256* (2013.01); *G06F 17/30253* (2013.01); *G06F 17/30259* (2013.01); *G06F 17/30277* (2013.01); *G06Q 30/0623* (2013.01)

(58) Field of Classification Search
CPC ..... G06F 17/302561; G06F 17/302591; G06F 17/302771; G06F 17/30253
See application file for complete search history.

(56) References Cited

U.S. PATENT DOCUMENTS

| 5,802,361 | A  | * | 9/1998  | Wang    | G06F 17/30256 379/202.01 |
| 8,718,369 | B1 | * | 5/2014  | Tompkins | G06F 17/30259 382/181 |
| 9,207,771 | B2 | * | 12/2015 | Antoniac | G06F 3/017 |
| 2010/0064254 | A1 | * | 3/2010  | Atsmon  | G06Q 30/0603 715/810 |
| 2010/0166339 | A1 |   | 7/2010  | Gokturk et al. | |
| 2011/0066984 | A1 |   | 3/2011  | Li | |
| 2011/0085697 | A1 | * | 4/2011  | Clippard | G06K 9/4652 382/100 |
| 2011/0312309 | A1 | * | 12/2011 | Makkonen | G06Q 30/02 455/414.2 |
| 2012/0154633 | A1 |   | 6/2012  | Rodriguez | |
| 2015/0071495 | A1 | * | 3/2015  | Makkonen | G06Q 30/02 382/103 |

* cited by examiner

*Primary Examiner* — Manav Seth
(74) *Attorney, Agent, or Firm* — Seed IP Law Group LLP (57) ABSTRACT

Techniques for facilitating a shape-based search of content items are disclosed. In some situations, the techniques include receiving a request for search of content that includes an image of an item and a glyph input by the user on the image that indicates a shape of the first item, extracting features associated with the item from an area of the image on which the glyph is input; identifying a shape category of the first item based at least in part on the indicated shape of the glyph; and conducting a search for items having features that match the extracted features of the first item, the search being conducted among a plurality of items associated with the identified shape category. The retrieved search results may be returned to a user.

24 Claims, 9 Drawing Sheets

TECHNIQUES FOR SHAPE-BASED SEARCH OF CONTENT

BACKGROUND

In a typical online merchandising environment, users can search for available items using, for example, one or more keywords related to the items. For example, a user may be able to search information about a specific item by providing a search engine with information such as a name of the item, and/or characteristics of the item. A number and variety of items available in the online merchandising environment and information related to these items have been increasing substantially. One aspect of this growth is that search results returned to the user in response to his or her search query may be too large for efficient browsing. Accordingly, when a user identifies an item of interest among the search results, it may be difficult for the user to find other items that are similar to the identified item, for example, if the user wishes to compare characteristics of similar items, such as shape, style and overall appearance, before purchasing an item. To refine the search results, the user typically has to describe the items of interest in further detail using additional keywords. Such additional descriptions may be labor intensive and error prone.

DETAILED DESCRIPTION

Techniques are presented for searching content that includes a plurality of items based on a provided item image and additional user input related to that item image. In a network-based environment (e.g., based upon the Internet), a user may conduct a search for any item of interest offered for viewing or sale on a network resource using one or more search services, such as at least one network search engine. A network resource may include a collection of content, such as from a Web site or electronic marketplace that can be accessed through a client browser or other such interface and displayed on a display of a computing device. A network resource visited by a user may contain information for one or more content items that the user has located, such as through browsing or search. In an embodiment, a user may be afforded an opportunity to refine his or her search using additional input indicating one or more particular characteristics (e.g., shape) of a desired item.

In an embodiment, a user may browse items offered for sale, for example, in a brick-and-mortar store. The user may take a picture of an item of interest, for example, using an image-capturing device of the user device, such as camera of a smart phone or other mobile device. The user may cause the captured image of the item to be displayed on his or her device. Alternatively, the captured image may be displayed automatically. The user may augment the captured item image by providing additional input associated with the captured image. For example, the user may "draw" a line on the display with the captured item image that would approximate a shape of the item. In an embodiment, the line (referred to herein as a "glyph") may in some embodiments be "drawn" by a single stroke or gesture that is substantially corresponds to the contour of an item image displayed on the user device. For example, a glyph may comprise a line that is within and/or proximate to the contour but without tracing an entire outline of the item image. In other embodiments, a glyph may be created in other manners, such as for a user to use multiple strokes to construct the glyph, to use a glyph that indicates a shape of an item without corresponding to the contour, to trace some or all of the outline of the item image, and the like. To provide the input, the user may use a special software tool provided with a search service implementing the described techniques, for example, a tool similar to one known as a "paintbrush." The user may use his or her finger for providing input if a user device is equipped with a touch screen. The user then may submit the captured image with the user's input to the search service. In at least some embodiments, the described techniques are performed by automated operations of a "Shape-Based Search Service," as described below in greater detail.

In an embodiment, the user may be browsing content items offered by one or more content providers via a network resource using, for example, his or her user device. In an embodiment, content items may have images associated with the items and stored with the network resource, for example, in a data storage associated with the network resource. While browsing, the user may select an item of interest based on the item image displayed on the user device interface (e.g., a display element). Similar to the embodiment described above, the user may augment the image of the item of interest by drawing a glyph approximating the image shape, and submit the item image (or an indication of an item image that is stored by a network resource or the Shape-Based Search Service) and the glyph to the Shape-Based Search Service.

In an embodiment, the Shape-Based Search Service may be configured to identify the provided glyph by matching the provided glyph to predefined glyphs associated with the Service. In one embodiment, the Service may include a predefined library of glyphs, each glyph defining a particular shape of an item, which may correspond to an item shape category, with each item shape category including multiple items having shapes corresponding to that category. For example, a library of glyphs defining shoe shapes may include an L-shape glyph defining a shape of a boot and a curved glyph defining a shape of a pump shoe with a low-cut front. In one embodiment, the library may be made accessible to the user so that the user may learn the shapes of glyphs that the Shape-Based Search Service may expect from the user, thus making the user's input easier for the user and more understandable for the Service. The Service may compare the provided glyph with the glyphs stored in the library in order to find a match. If a matching glyph is found, the Service may identify a shape category (e.g., a shoe shape category) associated with the matching glyph. Further, based on the glyph drawn within the contour of the item image, the Service may identify the area in the submitted image that contains the image of the item as opposed, for example, to the area containing the image background. The pixels comprising the item image may then be segmented out from the pixels comprising the image background. The item image, separated from the background, may be analyzed using known techniques, and features associated with the item (e.g., color, texture, and the like) may be extracted from the image. Based on the extracted features, a refined search for items may be conducted within the identified shape category (for example, using similarities techniques described below in greater detail) and retrieved results returned to the user.

In an embodiment, the Shape-Based Search Service may be configured to determine a shape category of an item without involving predefined shapes (glyphs) stored with the Service. For example, the glyph provided by the user may be analyzed in conjunction with the associated item image segmented out of the image captured by the user and, based on the analysis, the desired shape category may be inferred with satisfactory accuracy.

Figure 1:
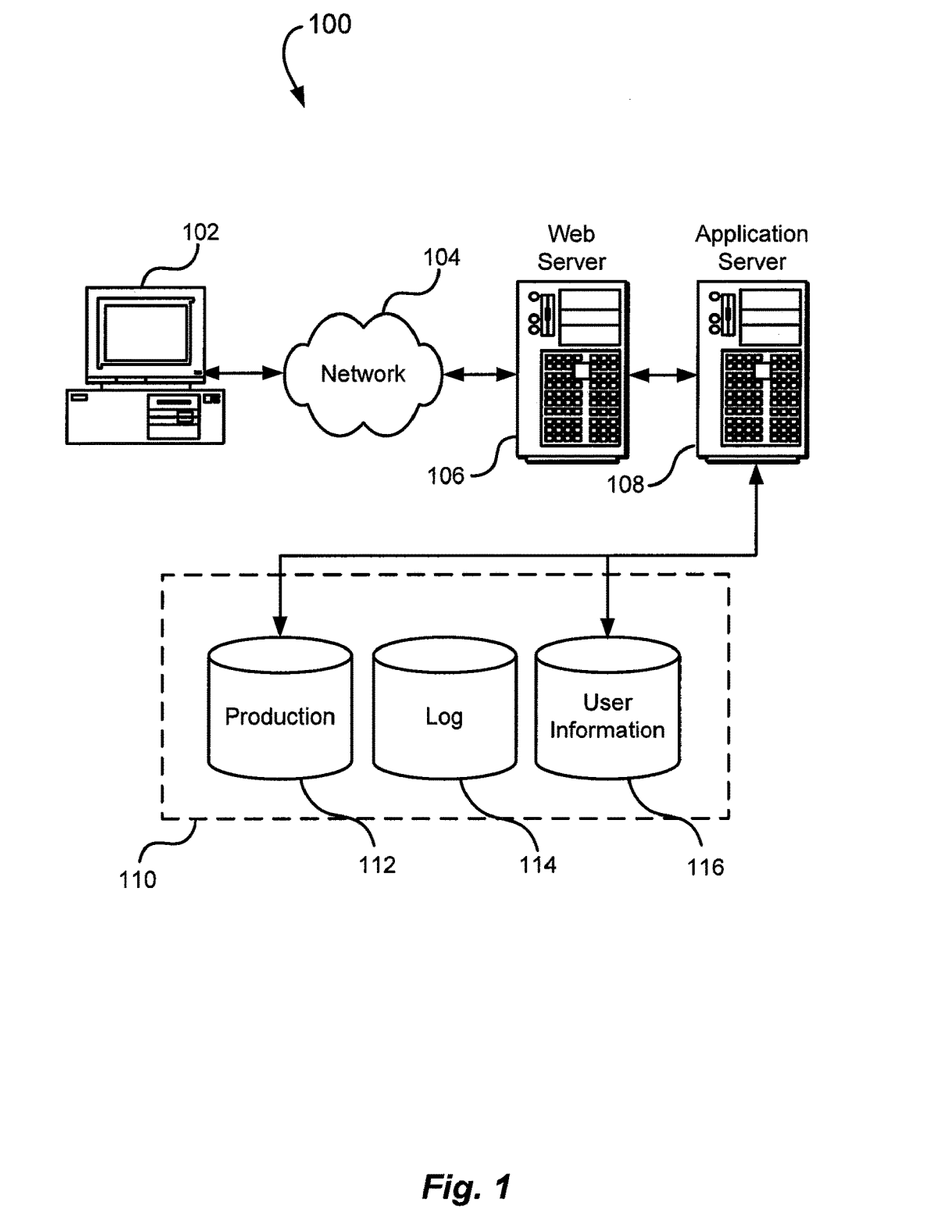
FIG. 1 illustrates an environment in which various embodiments may be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client (user) device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as described elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above-listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

Figure 2:
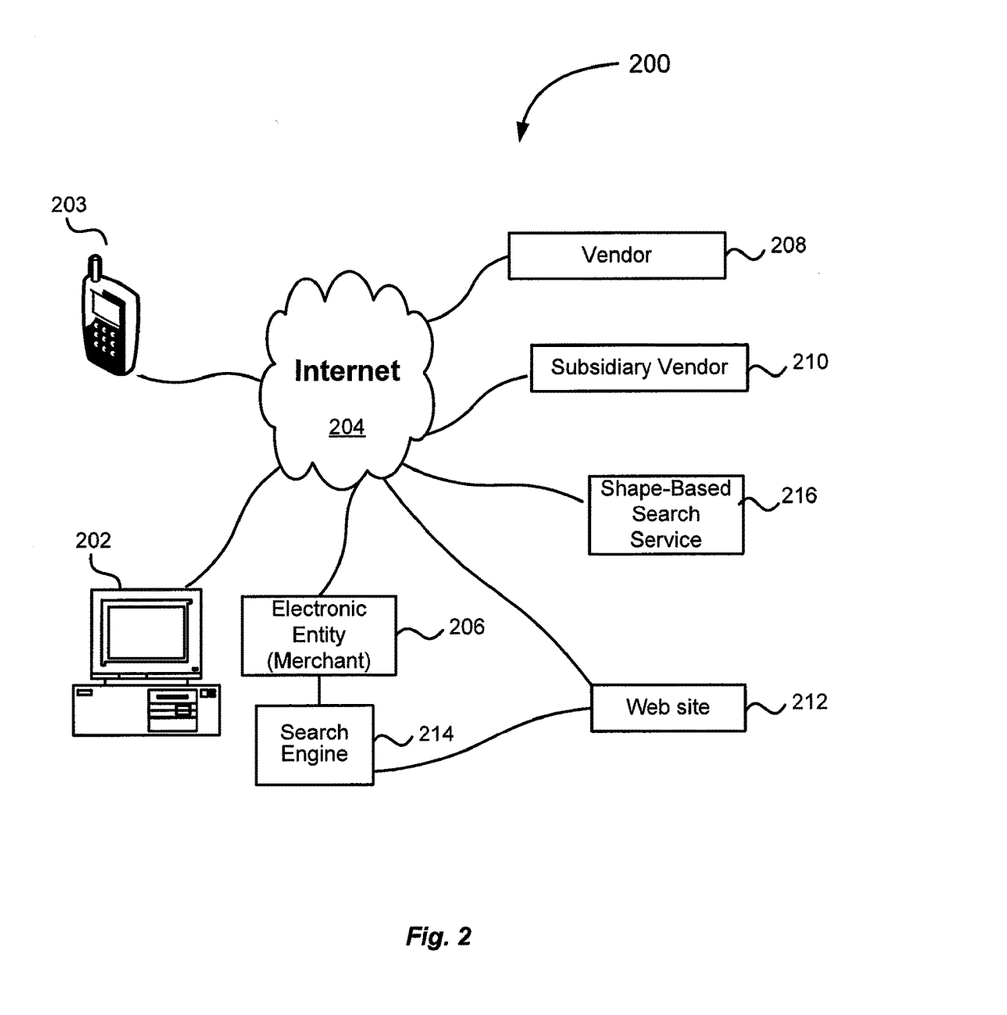
FIG. 2 illustrates an environment in which various embodiments may be practiced.

FIG. 2 shows an example environment 200, in which various embodiments may be practiced. The environment 200 may be realized utilizing one or more of the components of the environment described above in connection with FIG. 1. The environment 200, in an embodiment, includes a plurality of users operating client computing devices (user devices) 202 and 203 that utilize a network such as the Internet 204 to browse content of various content providers. While the environment 200 shows the client computing devices 202-203 utilizing the Internet, it should be understood that other networks may be used as an alternative to or in addition to the Internet 204. Examples of other networks include mobile networks, intranets, and generally any suitable communications network. Likewise, it should be understood that client computing devices 202 and 203 may include personal computers, cell phones, handheld messaging devices, laptop computers, set-top boxes, personal data assistants, electronic book readers, and the like. At least some of the devices 202-203 may include image capture devices, such as built-in cameras. At least some of the devices 202-203 may utilize a network 204, such as the Internet, to browse content of various content providers. It should be understood that other networks may be used as an alternative to or in addition to the network 204. Examples of other networks include mobile networks, intranets, Wi-Fi networks, home networks, corporate networks, and generally any suitable communications network.

In an embodiment, users may interact through devices 202 and 203 with other entities in order to consume content, search for information or items for consumption, purchase items for consumption, and the like. As used herein, an item for consumption includes any product or item which may be consumed by a consumer. Examples include tangible items, such as consumer products. Examples also include electronic items which may be downloaded and/or streamed, including audio files, video files, and other digital content. Other examples of items for consumption include services which may be performed for and/or on behalf of consumers. As shown in FIG. 2, the environment 200 includes an electronic entity, or merchant 206. The merchant 206, for example, may operate an electronic marketplace such that the users may search, via devices 202 or 203 utilizing search services (e.g., a Web search engine 214), for items for consumption offered by the merchant 206. The merchant 206 may offer items for consumption that come from various sources, including the merchant's own sources. For example, the merchant 206 may operate systems, such as those described above in connection with FIG. 1, that enable others to utilize the systems to offer items for consumption. In short, the merchant 206 may facilitate user search and consumption of items or products offered by the merchant 206 and/or vendors 208 and/or 210. It should be understood that the number and configuration of such entities may vary without affecting the techniques described herein. For example, the merchant 206 may operate systems, such as those described above in connection with FIG. 1, that enable others to utilize the systems to offer content.

In an embodiment, the environment 200 includes one or more affiliate or third-party vendors 208. In an embodiment, an affiliate vendor is a merchant who offers for consumption items that are actually consumed by consumers from the merchant 206. Affiliate vendors 208 may cooperate with the merchant 206 in various ways. In one embodiment, the merchant 206 may operate an electronic marketplace, such as a Web site 212 and advertise and/or sell items for consumption that are offered by the affiliate vendor 208. Affiliate vendors 208 may utilize various systems provided by the merchant 206, such as electronic search services that enable users to search for items for consumption, and other systems.

The environment 200 may include one or more subsidiary vendors 210. In an embodiment, a subsidiary vendor is a merchant whose operations may be controlled, either completely or partially, by the merchant 206. For example, a subsidiary vendor 210 may be operated by the merchant 206, but may offer items for consumption under a brand different from that of the merchant 206. The subsidiary vendor 210 may offer products for consumption that are the same as or different from those offered by the merchant 206. Alternatively, the subsidiary vendor 210 may be operated by the affiliate vendor 208, but may offer items for consumption under a different brand than the affiliate vendor 208, which may be advertised and/or offered for sale by the affiliate vendor 208 on the merchant 206's Web site 212.

In an embodiment, the environment 200 may include components and instructions for generating one or more Web sites 212. One or more of the Web sites 212 may be operated by the merchant 206, although they need not be. The Web sites 212 may offer various types of content, such as items for purchase, news, video, and the like. The Web sites 212 may offer other services, such as content or product search services, audio, social networking services, and the like. While the example environment 200 shows Web sites for the purpose of illustration, it should be understood that any type of content may be included in the environment 200 or variations thereof. For example, content may be provided in various ways, such as through an application interface or through other mechanisms that may not be properly classified as Web sites.

As noted, in an embodiment, the users may interact with content from the various entities, such as by searching for products offered by the entities, viewing content from the entities, consuming items from the entities, and the like. In order to search for items or other content provided by the entities, the users may utilize a search service, e.g., a Web search engine 214 in conjunction with a Shape-Based Search Service 216. As one skilled in the art will appreciate, a Web search engine may be software or a combination of software and hardware designed to search for information on the Internet. The search engine may be rendered to a client device 202 via a particular Web site or Web sites, such as the Web sites 212. The Web search engine 214 may be affiliated with the merchant 206 in a number of different ways, such as, for example, it may be designed and/or owned by the merchant 206, operated by the merchant 206, contracted by the merchant 206, be independent or autonomous from the merchant 206, and the like.

In one embodiment, the Shape-Based Search Service 216 may provide, to a client device or to electronic content offered by a network resource, an application in the form of, for example, a trusted script (e.g., JavaScript®) that is configured to perform one or more of the Service-related functions, such as enabling a user to browse for items of interest, identify or capture an image of an item of interest, provide user input (e.g., in a form of a gesture drawing a glyph approximating a shape of the captured item on the device display), submit a search query including the item image with associated user input, and receive search results corresponding to the submitted query. One skilled in the art will appreciate that there are different ways of enabling electronic content provided to a user or a user device with the Shape-Based Search Service. For example, one or more Web pages of a Web site provided by a content provider may include a trusted script configured to perform at least some of the Shape-Based Search Service functions as discussed above.

Figure 3:
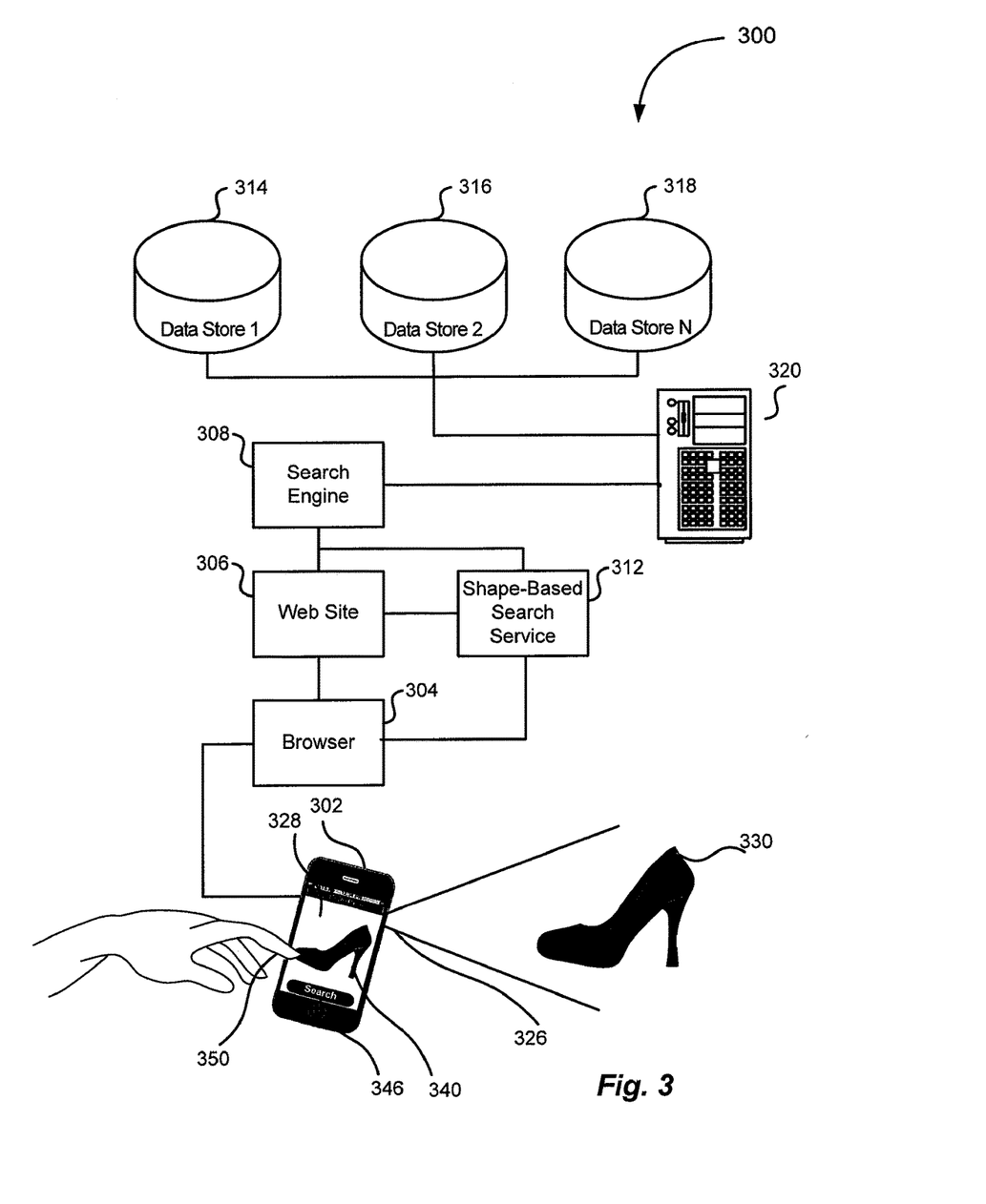
FIG. 3 illustrates a diagrammatic representation of an environment which may incorporate one or more components that are described above in connection with FIGS. 1 and 2 and that may be used in accordance with various embodiments.

FIG. 3 shows an illustrative environment 300 that an electronic entity such as the merchant 206 may utilize in order to provide a user with the ability to conduct a shape-based search for product items or other content offered by the merchant 206 and/or vendors 208, 210 using Shape-Based Search Service 216 in accordance with an embodiment. In an embodiment, the environment 300 of FIG. 3 is utilized by an electronic entity (such as the merchant 206 shown in FIG. 2) to provide a user with an ability to capture or select an item image, provide user input including a glyph indicating the image shape, and conduct a search for items based on the provided input using a Shape-Based Search Service 312 described herein. It is to be understood that the Shape-Based Search Service may comprise a number of various implementations, including, but not limited to, a software application component executed on a computing device, such as one or more Web servers. In one embodiment, the service may be offered as a part of remote computing services that together make up a cloud computing platform, offered over the Internet. The service may be configured to run in a Web server environment, such as a pure Java HTTP Web server environment.

In an embodiment, the environment 300 includes a user device 302 utilized by a user for interaction with electronic entities that provide content. Content may be accessed by a user operating the device 302 through a browser 304. For example, content may include products or items of various types that are to be placed on a Web site 306. The Web site 306 may utilize a search engine 308 in order to provide a user with the ability to search for products offered by the merchant 206 or other entities. The content may be stored in the remote content data stores 314, 316, 318 and may be utilized by merchants, Web sites, or other entities in order to provide users an opportunity to search for and view items for consumption and/or other content by navigating to a Web site 306 operated by a merchant (e.g., merchant 206 on FIG. 2) through a Web server 320. For example, the data stores may be associated with the server 320 serving the Web site 306 operated by the merchant 206. The data stores may be accessible with the search engine 308 through the Internet or any other type of computer network known in the art. It will be appreciated that the content may be stored in one or more data stores and that three data stores 314, 316, 318 are shown purely for illustrative purposes, such that the number of data stores is not limited to three or any other number.

In an embodiment, a Shape-Based Search Service 312, operating on the device 302 or on another remote system (not shown) from which an interface is provided to the device 302, is configured to provide a user with an ability to select an image of an item of interest, provide user input in a form of a glyph approximating an item shape, and submit the image with the provided input to the Service. In one embodiment, the user device 302 may be equipped with an image capture device (e.g., a camera) 326. The user device may be also equipped with a user interface (e.g., a display or a screen) 328 on which the captured items image and/or images of items offered for purchase by a merchant may be displayed.

In order to conduct a search for items similar to the item of interest, a user of the device 302 may capture an image of the item of interest 330 (e.g., a shoe) with the image capture device 326. The captured image 340 of the item of interest 330 may be displayed on the screen 328 as shown in FIG. 3. If the screen 328 is configured to receive a touch input (i.e., the screen 328 is a touch screen), the user may draw a shape glyph of the item 330 within and/or proximate to the contour of the captured image 340 using his or her finger 350 as shown in FIG. 3. In another embodiment, the user may utilize other means of input, e.g., a stylus, a mouse, a keyboard, or any other device configured to facilitate user interaction with the user device. In one embodiment, a special software tool may be provided by the Shape-Based Search Service, for example, a tool similar to one known as a "paintbrush."

The user then may submit his or her search request containing the item image and the glyph defining the item shape to the Shape-Based Search Service. The search request may be submitted using, for example, a "Search" button 346 of the user device 302. The Service may then analyze the submitted image and associated user input. For example, the Service may infer a shape category for an item from the submitted glyph as described above. The Service may also extract features associated with the item from the item image using known image detection and recognition techniques. Then, the Service may conduct a search for items similar to that submitted by the user based on the identified item category and item features. In order to conduct the search, the Service may access the Web site 306 and, through the Web site, one or more data stores 314-318 containing items, products, or other content. The Web site 306 may be displayed on the computing device 302 via the browser 304. In one embodiment, content stored in the data stores 314-318 may be classified into different categories (e.g., shape categories) and have attributes (features) associated with each item (e.g., color, price, texture, size, availability, and the like).

When a user sends a search request for an item via the Shape-Based Search Service 312, the data corresponding to the user's request is assembled and returned to the user via the Web site 306 served by the server 320 and rendered by browser 304 on computing device 302. The user then may refine his or her search, if necessary, using an image of one or more items in the search results returned by the Shape-Based Search Service 312 and associated search engine 308. In an embodiment, the user may input additional glyphs that would correspond to a refined shape category. For example, if the initial shape category was determined to be a "shoe" based on the first user input, a refined search may be initiated by the user inputting ("drawing") a glyph indicating a shape category "pump shoe" associated with the item image selected from the search results. Alternatively or additionally, if the initial or refined shape category was determined to be a "pump shoe" based on user input, a refined search may be initiated by the user inputting ("drawing") a glyph indicating a shape category "pump shoe with an ankle strap" associated with the item image selected from the search results.

Figure 4:
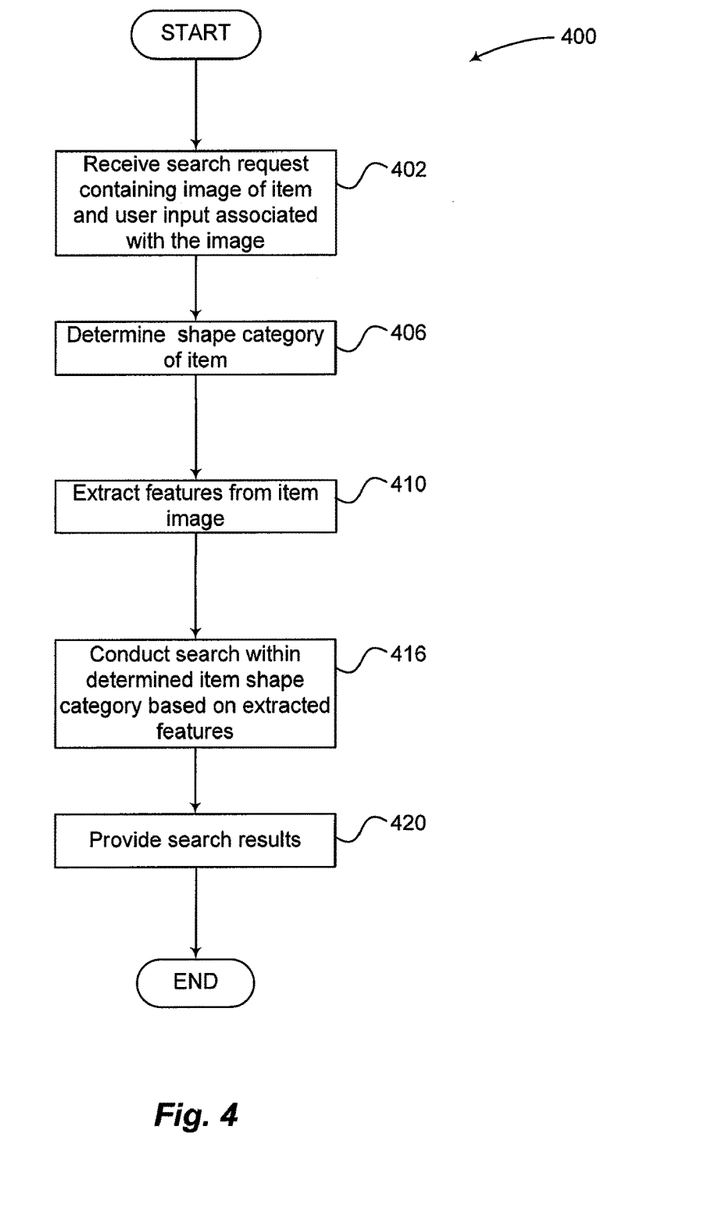
FIG. 4 illustrates a process flow diagram for facilitating a shape-based item search using the Shape-Based Search Service in accordance with an embodiment.

FIG. 4 is a process flow diagram for facilitating a shape-based search of content items in accordance with an embodiment. The Shape-Based Search Service described herein is configured to facilitate the search process illustrated in FIG. 4 at a high level. The process 400 begins with block 402, where a search request for content items containing an image of an item of interest and a user input including the glyph indicating the shape of the item is received from a user. At block 406, based on the user input, the shape category of the item is determined. At block 410, the item features may be extracted from the received item image. At block 416, a search is conducted within the determined shape category based on the extracted features of the item.

At block 420, the retrieved search results are provided to the user. The process 400 then ends.

Figure 5:
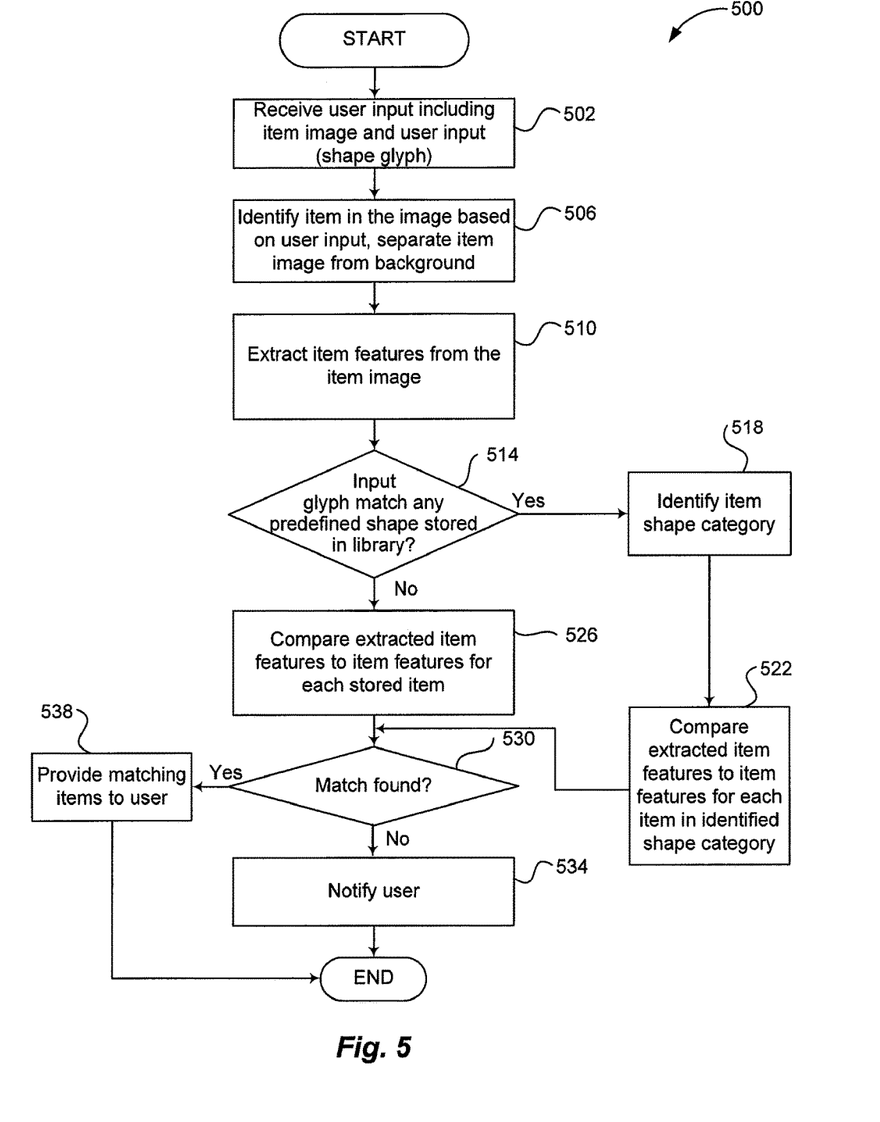
FIG. 5 illustrates a process flow diagram for facilitating a shape-based item search using the Shape-Based Search Service in accordance with another embodiment.

FIG. 5 is a detailed process flow diagram for facilitating a shape-based search of content items in accordance with an embodiment. In an embodiment, a user may take a picture of an item of interest, for example, using an image-capturing capability of the user device, such as a smart phone or other mobile device. The captured image of the item may be displayed on the user device as described above in reference to FIG. 3.

In an embodiment, a user may be browsing content items offered via a network resource. An example of a network resource may include one or more Web pages of a Web site that is suitable for the World Wide Web and can be accessed through a Web browser and displayed on a display screen of a user device, where at least some content for the Web site (e.g., including one or more content items is pulled from at least one data store. The user may select an item of interest displayed on the user device. Typically, items will have item images that may be displayed to the user when retrieved from a data storage associated with a Web site offering content items for viewing and/or purchase. The user may augment an image of the item of interest by drawing a glyph approximating the image shape at least in part within the item contour in the image. Once the user completes the input, he or she may submit the search request including the selected image and the glyph drawn to the Shape-Based Search Service.

Accordingly, the process 500 begins with block 502, where the user input, including an item image and a provided input, is received. At block 506, the item in the image is identified based on the provided glyph. In an embodiment, based on the glyph drawn at least in part within the contour of the item image, the image of the item may be separated from the image background or other images included in the image provided by the user. Specifically, the user-input glyph that is drawn at least in part within the item contour in the image points to the area in the image where the item image is located. Accordingly, the pixels comprising the item image may then be segmented out from the pixels comprising the image background or other images that may not be of interest. For example, the captured or selected image may contain a shoe (an item of interest), a sock and a part of a pant. The regions in the captured image containing the sock and the pant may be separated from the regions containing the interior of the shoe based on the glyph drawn at least in part within the interior of the shoe image. Thus, the item of interest may be segmented out of the image background and cleared from "noise." The item image, separated from the background, may be analyzed and features associated with the item (e.g., color, texture, and the like) may be extracted, at block 510, from the image using known image recognition and image detection techniques.

In one embodiment, the shape category may be determined by comparing glyphs stored in a predefined library with the glyph resulting from the user input. Each glyph in the library may define a particular shape of an item. For example, an L-shape glyph may define a shape (and/or a shape category) of a boot and an appropriately curved glyph may define a shape (and/or a shape category) of a pump shoe with a low-cut front. If the comparison of the user-input glyph and the stored glyphs produces a match, the shape category corresponding to the matching stored glyph may be identified.

Accordingly, at determination block 514 it is determined whether the user-submitted shape glyph matches any predefined shapes stored in the predefined library with the Shape-Based Search Service. If no matches are found, the process moves to block 526, where the extracted item features may be compared to the features associated with items stored by the network resource. For example, if no shoe shape is identified, the search based on the extracted item features may be conducted for all types of shoes stored with the network resource.

To enable the search based on extracted features, the following technique may be used. A collection of content items associated with one or more images of items may be enabled at least in part by associating the collection of content and/or its associated inventory images with representative refinement shapes. Inventory items may be grouped into categories and at least one refinement shape is created for each of the categories. A refinement-shape hierarchy may be created by arranging the refinement shapes into parent and child refinement shapes.

A set of training images of training items (e.g., images of items contained in the search request) may be received and individual training images may be assigned to representative refinement shapes based at least in part on similarities between the refinement shapes and shapes of the training items reflected in the training images. Training images may be analyzed to calculate representative histogram descriptors. In such cases, the histogram descriptors of the training images assigned to a particular refinement shape define, at least in part, the descriptor space for that refinement shape.

Inventory images may also be analyzed to calculate representative histogram descriptors. Inventory images may assigned to the refinement shapes of the refinement-shape hierarchy based at least in part on similarities between the histogram descriptors of the inventory images and the histogram descriptors of the training images that define the descriptor space of the refinement shapes. According to some embodiments, local-shape, global-shape, texture, and contour histogram descriptors may be calculated for each of the inventory images and training images. Local-shape histogram descriptors describe the local shape of the item reflected in the image, global-shape histogram descriptors describe the overall shape of the item reflected in the image, texture histogram descriptors describe patterns that exist in the texture of the item reflected in the image, and contour histogram descriptors describe the contour of the item reflected in the image. For each image, any two or more of the local-shape, global-shape, texture, and contour histogram descriptors of the image may be combined into a combined histogram descriptor.

The techniques for a search based on similarities between items are described, for example, in a U.S. patent application Ser. No. 12/895,617 titled "SHAPE-BASED SEARCH OF A COLLECTION OF CONTENT" filed Sep. 30, 2010, U.S. patent application Ser. No. 12/895,527 titled "PROCESSING AND COMPARING IMAGES" filed Sep. 30, 2010, U.S. patent application Ser. No. 12/895,506 titled "CONTOUR DETECTION AND IMAGE CLASSIFICATION filed Sep. 30, 2010, and U.S. patent application Ser. No. 12/895,601 titled "CONTENT SEARCH WITH CATEGORY-AWARE VISUAL SIMILARITY" filed Sep. 30, 2010, each of which is assigned to the assignee of this document and incorporated by reference in its entirety.

Referring back to FIG. 5, if at least one match is found, at block 518 the shape category corresponding to the matching glyph is identified. For example, the shape category may be identified as a "pump shoes." Accordingly, if the matching glyph reproduced a shape of a pump shoe, a narrower category "pump shoes" may be identified within the broad category "all shoes," thus substantially refining the search.

At block 522 the features extracted from the item are compared to item features for each item in the identified shape category as described above in reference to block 526.

At determination block 530 it is determined whether any matches between the extracted features and features pertinent to stored items are found. If at least one match is found, at block 538 the matching items are provided to the user. If no matches are found, the user is notified accordingly at block 534. The process 500 then ends.

Figure 6:
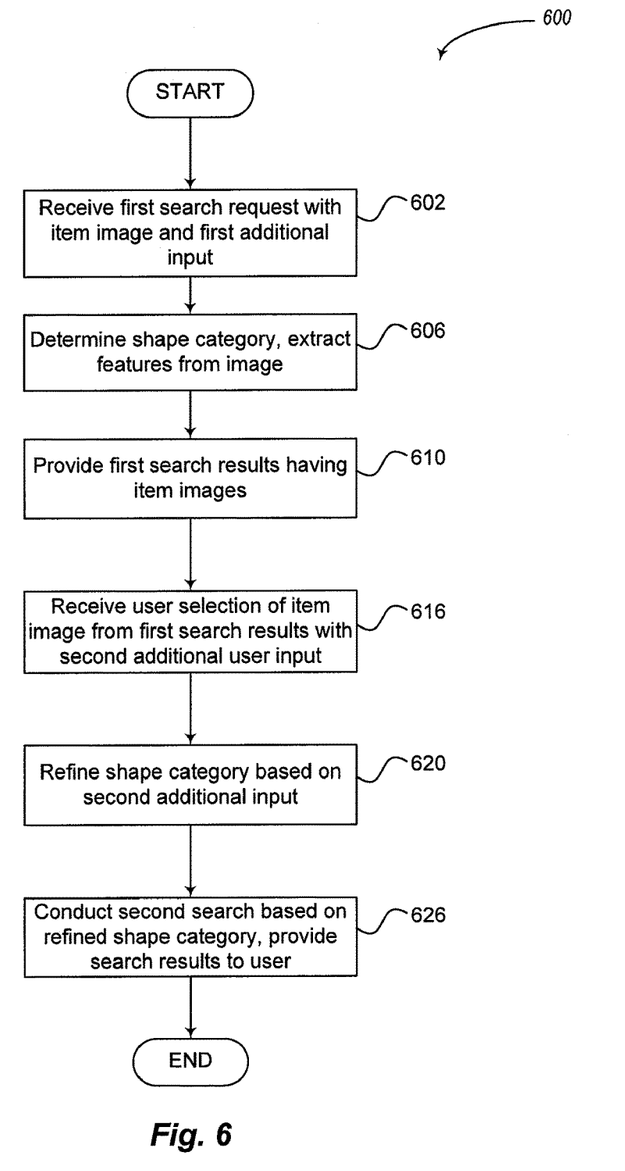
FIG. 6 illustrates a process flow diagram for facilitating a shape-based item search using the Shape-Based Search Service in accordance with yet another embodiment.

FIG. 6 is a process flow diagram for facilitating search of content items in accordance with yet another embodiment. In an embodiment, a user may further refine his or her search by further indicating a shape of a desired item after the initial search results are returned in response to the user's first request as described above in reference to FIGS. 2-5. The user may refine the search by inputting an additional glyph that may further define the shape of the desired item. For example, if a first, initial search request contained an item image (a shoe) with the user-input glyph indicating a shape as being a "pump shoe," a second request may contain an image of a particular pump shoe selected by the user from the search results returned in response to the first search request. In addition, the request may contain a second user input in the form of a glyph indicating particular details on the pump shoe, for example, an ankle strap or any other shape feature that is of interest to the user, which may not have been captured in the first search. A second, refined search may then be conducted based on the submitted user request.

The process 600 begins at block 602, where the first search request, including an item image and input from the user in the form of a glyph, is received. At block 606, the shape category is determined and the item features are extracted from the image as described above in reference to FIGS. 4-5. At block 610, the first search results, including item images, are provided to the user. Viewing the search results, the user may selects a new image of an item that is of interest to the user. Alternatively, the user may use the same image of interest as the one that was associated with the first search request. The user may provide an input in a form of a glyph that further indicates the shape of the item and submit the request containing the newly selected image (or the same image) and the user input to the Shape-Based Search Service. The second request containing the selected item image and the second user input is received at block 616. At block 620 the shape category is refined based on the second additional input as described above in reference to FIGS. 4-5. In an embodiment, the new item features may be extracted from the newly selected item image and a new search may be conducted based on comparison between newly extracted item features and the features pertaining to items that correspond to the newly defined shape category. In another embodiment, the features extracted from the first item image may be used as search criteria. At block 626, the new search for items is conducted and second search results are provided to the user. The process 600 then ends.

Figure 7:
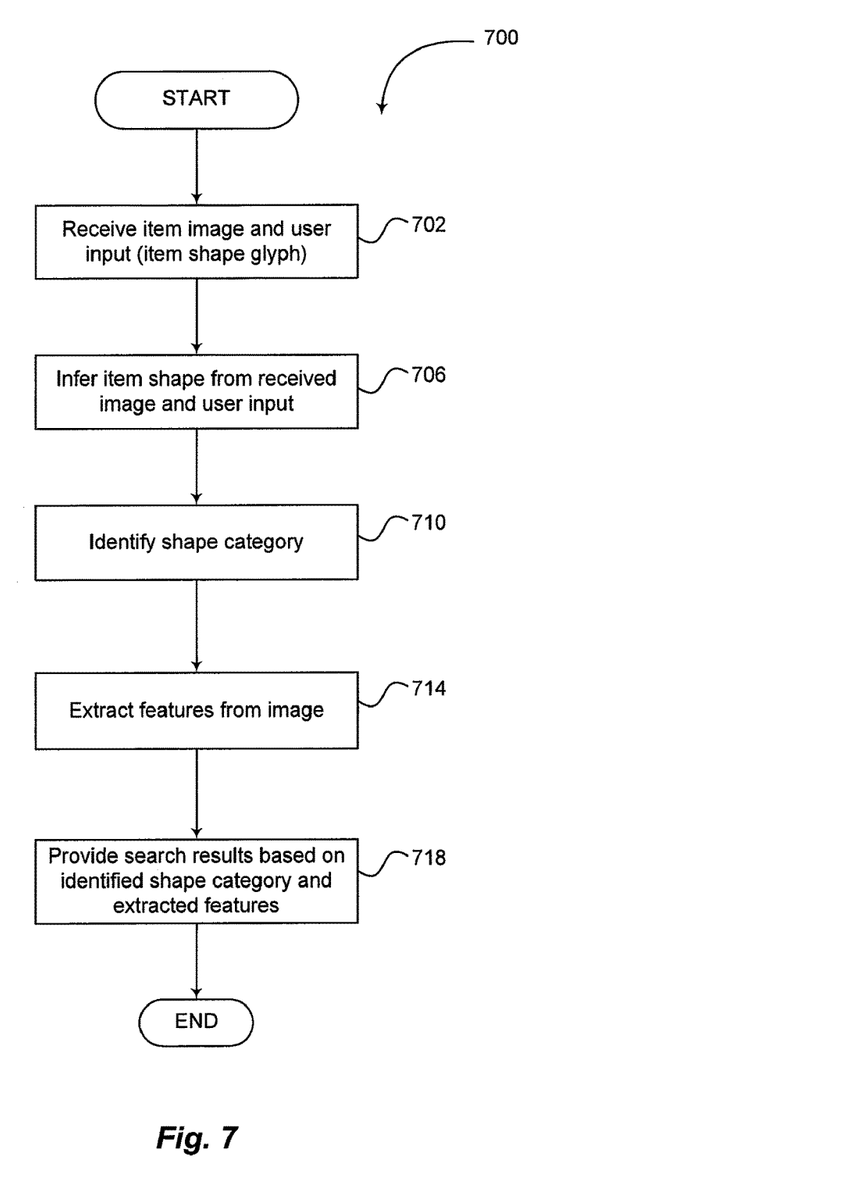
FIG. 7 illustrates a process flow diagram for facilitating a shape-based item search using the Shape-Based Search Service in accordance with yet another embodiment.

FIG. 7 is a process flow diagram for facilitating search of content items in accordance with yet another embodiment. In an embodiment, the Shape-Based Search Service may be configured to determine a shape category of an item without matching the input glyph with predefined shapes (glyphs) stored with the Service as described above in reference to FIGS. 4-5. For example, the input (glyph) provided by the user may be analyzed in conjunction with the associated item image segmented out of the image captured by the user and, based on the analysis, the desired shape category may be inferred with determined accuracy.

For example, if a user selects an image of a shoe of interest, draws a glyph indicating a shape of the shoe (e.g., "colors in" the shoe image), and submits the search request comprising this information, the Shape-Based Search Service may infer the shape category from the shoe image (once the image is separated from the background) combined with shape information that may be discerned from the input shape glyph. Specifically, shapes of a particular item may have a finite (often limited to a few) number of shapes, and shape categories may be classified according to that number. Accordingly, the shape category may be inferred from the segmented item image and the input shape glyph (or simply from the segmented item image) based on known item shape categories without having to compare the input glyph to predefined glyphs stored with the Service, as was discussed above in reference to FIGS. 4-5.

The process 700 begins at block 702, where the image of an item of interest and the user input (glyph) are received. At block 706, the desired shape of the item is inferred from the item image segmented from the background (in one embodiment, the shape may be inferred from the combination of information defining the item image and the shape glyph input by the user). At block 710, the shape category is determined based on the inferred shape. At block 714, the features are extracted from the image of the segmented item as discussed above in reference to FIGS. 4-5. At block 718, the search is conducted based on the identified shape category and extracted features, and search results are provided to the user. Process 700 then ends.

Figure 8:
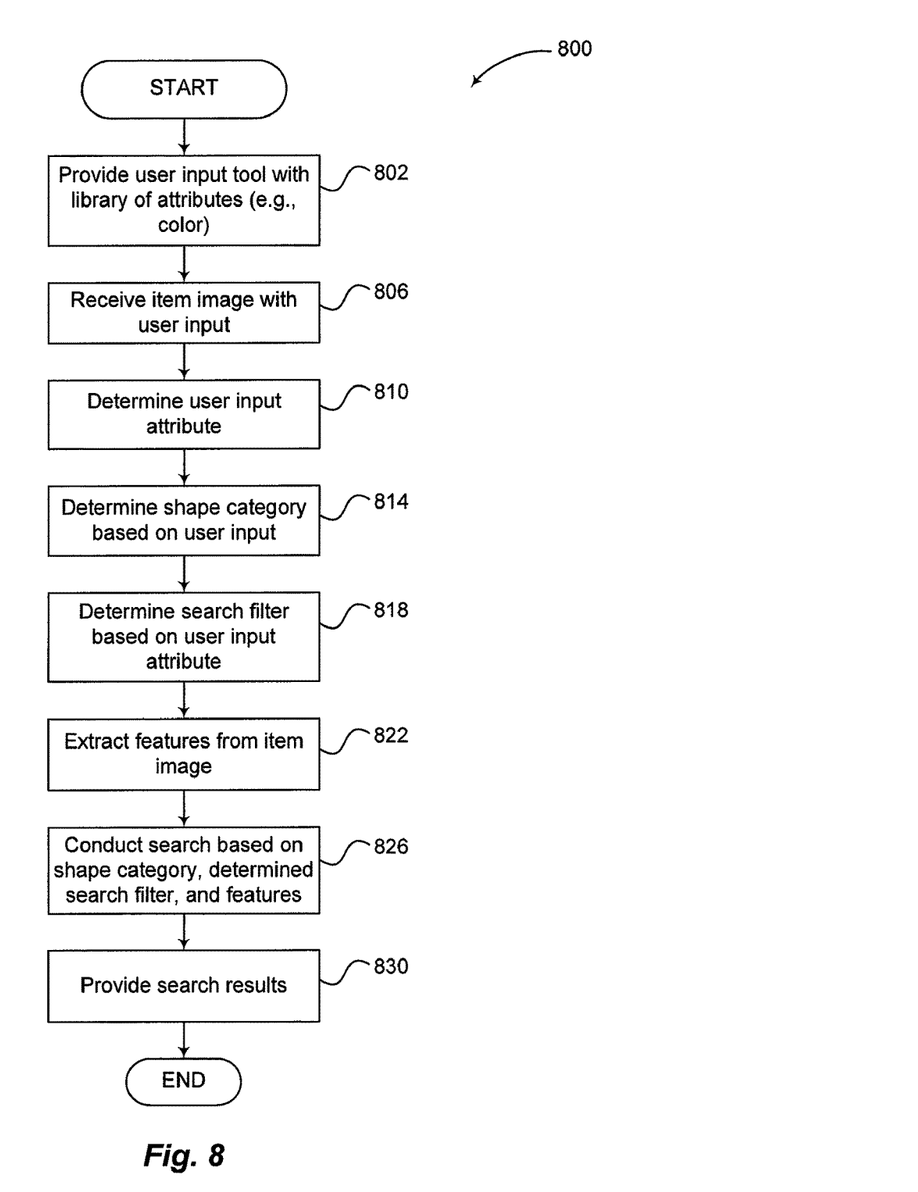
FIG. 8 illustrates a process flow diagram for facilitating a shape-based item search using the Shape-Based Search Service in accordance with yet another embodiment.

FIG. 8 is a process flow diagram for facilitating search of content items in accordance with yet another embodiment. In an embodiment, a user input tool provided by the Shape-Based Search Service for drawing an item shape on the item image displayed to the user may have associated attributes. These attributes may define particular features for the item that may be of interest to the user. For example, a "paintbrush" tool that may be used to "color in" the item image on the user device screen (i.e., by drawing a shape glyph over or within the item image contour) may have an associated color palette, where each color may identify a color of interest for the selected item image. For example, if a user uses a blue "paintbrush" to draw a shoe shape glyph over the captured shoe image on the device screen, the Service may infer that the user is interested in the shoes of the shape corresponding to the glyph and the color corresponding to the glyph color, namely, a blue color. In general, a color of the brush may represent any search filter or search criterion. Specifically, different brush colors may represent particular attributes of an item of interest, such as price ranges, sizes, styles, makes, brands, patterns, material, and the like. For example, a red color may correspond to a $40-60 price range for a desired item, a blue color may correspond to a $60-100 price range for the item, and so on. Based on the color of the glyph, the Service may conclude that the search needs to be done only within a specific price range (e.g., for a blue glyph, the search will be conducted within the $60-100 price range for a desired item).

According to the above description, the process 800 begins at block 802, where user input tools with associated attributes (e.g., a "paintbrush" with color palette) are provided to the user (e.g., to the user device). At block 806, the selected or captured item image is associated with the user input provided with the tool with a selected tool attribute (e.g., an item shape glyph drawn with the blue "paintbrush" over the item image), and the search request containing this information is submitted by, and received from, the user. At block 810, the user input attribute is determined. For example, it is determined that the color used for drawing a glyph was blue. At block 814, the shape category is determined based on the provided search request as described above in reference to FIGS. 4-5. At block 818, the search filter is determined based on the determined input attribute. For example, it may be determined, based on the color of the glyph, that the search should be conducted for items of a particular color. At block 822, the features are extracted from the item image. At block 826 the search is conducted based on the shape category, determined search filter (search criterion), and extracted features of the item. At block 830, search results are provided to the user. The process 800 then ends.

Figure 9:
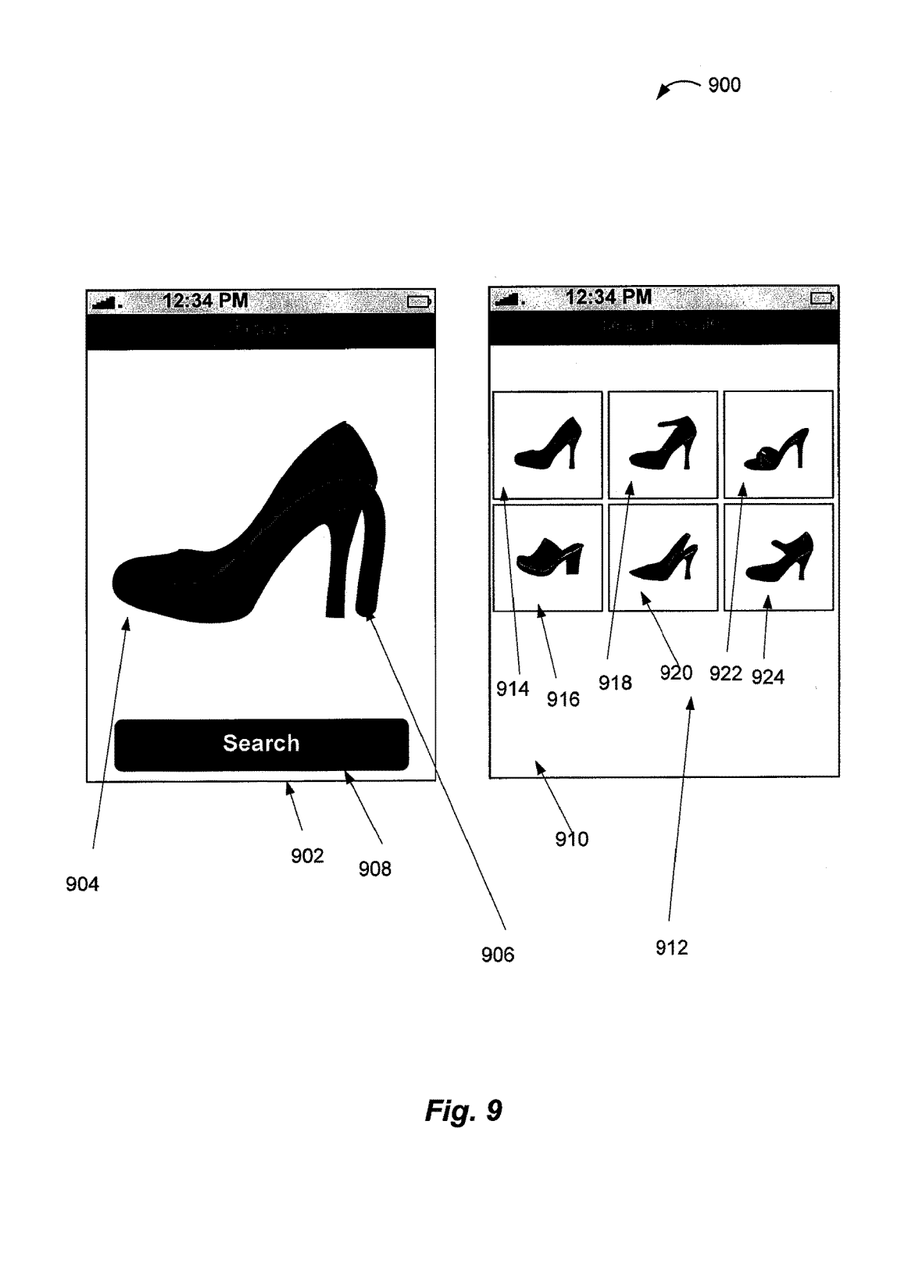
FIG. 9 illustrates example screenshots of a user interface for the Shape-Based Search Service in accordance with an embodiment.

FIG. 9 illustrates example screenshots of a content page displayed to a user on a user device in accordance with an embodiment. The screenshots illustrated in FIG. 9 are shown for illustrative purposes only and should not be interpreted as limiting the scope of the various embodiments. The screenshot collection 900 includes a screen 902 of a user device showing an image 904 of an item of interest (e.g., a pump shoe) captured by the user via an image capture device associated with the user device or selected as a result of browsing the Internet. The user may draw a glyph 906 replicating the shape of the item of interest substantially within the contour of the image 904 as shown in FIG. 3, thus "coloring in" the item. As discussed above, the user may use his or her finger (in case of a touch screen configured to accept user touch input) or use a tool (e.g., "paintbrush") provided by the Shape-Based Search Service. The user may submit the captured image and the glyph drawn on the screen to the Service as a search request, using the "search" button 908. The Service will conduct a search based on the information provided in the search request as discussed above in reference to FIGS. 2-8.

The screenshot collection 900 also includes a screen 910 of the user device showing search results 912 returned in response to the search request compiled and entered as described in reference to the screen 902. For illustrative purposes only, the screen 910 displaying the search results 912 may include a plurality of images 914-924 of items (e.g., pump shoes) returned with the search conducted by the Shape-Based Search Service. In the illustrated example, there are six images 914-924 shown to the user on one screen. It is understood that any number of search results may be displayed on the screen 910 at any given time depending on particular configuration of the Service. In addition, information associated with each search result may be displayed, such as price, availability, size, color, maker, and the like.

In an embodiment, the search results may be sorted and displayed in order of conformity to the identified shape category for the item. For example, shoes that are determined to have the shape that conforms to the identified shape category the most, may be displayed more prominently (e.g., higher than other results) on the list of results than the shoes that are determined to have less conformity with the identified shape. As illustrated in the search results 912, the item 914 conforms the best to the shape of the item of interest 904 and corresponding glyph 906. Accordingly, the item 914 is displayed the first on the list of results comprising a plurality of images 914-924 of item. By the same token, item 924 that bears the least resemblance among the items 914-924 to the shape indicated by the glyph 906 is displayed the last on the list of results 914-924.

As discussed above, the various embodiments can be implemented in a wide variety of operating environments, which, in some cases, can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for facilitating a shape-based search, comprising:
    under control of one or more computer systems configured with executable instructions, providing an image of a first item for display to a user on a touch-sensitive screen;
    receiving, for use in a search request, input from a user on the displayed image including a glyph that indicates a shape of the first item without tracing an outline of the first item in the image and that identifies a portion of the displayed image having one or more features associated with the first item to use in the search request;
    extracting the one or more features from the portion of the image identified by the glyph;
    identifying, based at least in part on the shape indicated by the glyph, a shape category of the first item from a plurality of predefined item shapes;
    conducting a search for additional items having features that match the extracted features of the first item, the search being conducted among a plurality of items associated with the identified shape category; and
    providing search results including one or more of the additional items from the search.

2. The computer-implemented method of claim 1, wherein the image is captured by a user device.

3. The computer-implemented method of claim 2, wherein the user device includes a display component configured to display images of items to the user and to receive user input comprising glyphs indicating shapes of the displayed item images.

4. The computer-implemented method of claim 1, wherein the image is provided to the user in response to the user browsing content items with the user device.

5. The computer-implemented method of claim 1, wherein the extracted features include at least one of a texture of the first item and a contour of the first item, and wherein the search for items having features that match the extracted features is based on calculating similarities between the respective features.

6. The computer-implemented method of claim 1 wherein the glyph included with the search request is input by the user on the image, wherein the identifying of the shape category of the first item is based on comparing the shape indicated by the glyph with the plurality of predefined item shapes, and wherein the identified shape category is associated with one of the plurality of predefined item shapes that is selected for the first item based on the comparing.

7. The computer-implemented method of claim 1 wherein the user input includes an indication of a color of the first item, and wherein the search for additional items is further based on identifying additional items of the indicated color.

8. The computer-implemented method of claim 1 wherein the glyph included with the search request is input by the user on the image as a single-stroke figure.

9. A computer system for facilitating a shape-based search, the system comprising:
    at least one processor; and
    at least one memory having computer-executable instructions that, when executed on the at least one processor, cause the at least one processor to:
        receive information from a request by a user for a search of content, the received information indicating an image of a first item and including a glyph that is input by the user for the image and that indicates a shape of the first item;
        identify, based at least in part on the shape indicated by the glyph, a shape category for the first item from multiple defined shape categories;
        conduct a search among a plurality of items associated with the identified shape category to identify one or more additional items having shapes similar to the first item; and
        provide search results indicating the one or more additional items.

10. The computer system of claim 9 wherein the computer-executable instructions further cause the at least one processor to extract one or more features associated with the first item from an area of the image corresponding to the glyph, and to conduct the search to identify the one or more additional items by identifying additional items having at least one feature that matches the extracted one or more features.

11. The computer system of claim 10 wherein the computer-executable instructions further cause the at least one processor to determine at least one attribute associated with the glyph and to conduct the search to identify the one or more additional items by further identifying additional items having the at least one attribute.

12. A non-transitory computer-readable medium having computer-executable instructions for facilitating a shape-based search stored thereon that, when executed by a computer, cause the computer to:
receive a request from a user for a search of content, the request indicating an image of a first item and including a glyph input by the user to indicate a shape of the first item that corresponds to a partial contour of the first item in the image;
identify, based at least in part on the shape indicated by the glyph, a shape category of the first item that is selected from a plurality of predefined item shapes;
conduct a search among a plurality of items associated with the identified shape category to identify one or more additional items having shapes similar to the first item; and
provide, to the user, search results indicating the one or more additional items.

13. The non-transitory computer-readable medium of claim 12 wherein the request is received from a user device that includes a display component configured to display images of items to the user and to receive user input including glyphs indicating shapes of the displayed item images.

14. The non-transitory computer-readable medium of claim 12 wherein the glyph included with the request is input by the user on the image, and wherein the computer-executable instructions further cause the computer to extract one or more features associated with the first item from an area of the image corresponding to the glyph, and to conduct the search to identify the one or more additional items by identifying additional items having at least one feature that matches at least one of the extracted one or more features.

15. The non-transitory computer-readable medium of claim 12 wherein the computer-executable instructions that cause the computer to identify the shape category of the first item further cause the computer to compare the shape indicated by the glyph to the plurality of predefined item shapes to determine a match to at least one predefined item shape of the plurality of predefined item shapes, and wherein the identified shape category is associated with the at least one predefined item shape.

16. The non-transitory computer-readable medium of claim 12 wherein the computer-executable instructions that cause the computer to identify the shape category of the first item further cause the computer to compare the shape indicated by the glyph with shapes of the one or more additional items, the one or more additional items being distinct from the first item.

17. The non-transitory computer-readable medium of claim 12 wherein the identified shape category corresponds to one of multiple categories of products, and wherein the search to identify the one or more additional items is performed among products of the one category.

18. The non-transitory computer-readable medium of claim 12 wherein the identified shape category corresponds to one of multiple types of products, and wherein the search to identify the one or more additional items is performed among products of the one type.

19. The computer-implemented method of claim 1 wherein the identified shape category corresponds to one of multiple categories of products, and wherein the search for the additional items is performed among products of the one category.

20. The computer-implemented method of claim 1 wherein the identified shape category corresponds to one of multiple types of products, and wherein the search for the additional items is performed among products of the one type.

21. The computer system of claim 9 wherein the identified shape category corresponds to one of multiple categories of products, and wherein the search to identify the one or more additional items is performed among products of the one category.

22. The computer system of claim 9 wherein the identified shape category corresponds to one of multiple types of products, and wherein the search to identify the one or more additional items is performed among products of the one type.

23. The computer system of claim 9 wherein the computer system is a user device having an image capture component, and wherein the indicated image is generated by the image capture component.

24. The computer system of claim 23 further comprising a display component configured to display images of items to the user and to receive user input including glyphs indicating shapes of the displayed item images.

* * * * *